(12) United States Patent
Chen et al.

(10) Patent No.: US 8,351,441 B2
(45) Date of Patent: *Jan. 8, 2013

(54) PERSONALIZED MULTIMEDIA SERVICES USING A MOBILE SERVICE PLATFORM

(75) Inventors: Yih-Farn Robin Chen, Bridgewater, NJ (US); Huale Huang, Kearny, NJ (US); Rittwik Jana, Pinebrook, NJ (US); Sam John, Atlanta, GA (US); Serban Jora, Hackettstown, NJ (US); Bin Wei, Bridgewater, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/456,801

(22) Filed: Jun. 23, 2009

(65) Prior Publication Data

US 2009/0264103 A1 Oct. 22, 2009

Related U.S. Application Data

(63) Continuation of application No. 10/136,540, filed on May 1, 2002, now Pat. No. 7,567,575.

(60) Provisional application No. 60/317,712, filed on Sep. 7, 2001.

(51) Int. Cl.
*H04L 12/28* (2006.01)
(52) U.S. Cl. ......... 370/401; 370/338; 370/466; 370/352
(58) Field of Classification Search ........................ None
See application file for complete search history.

(56) References Cited

U.S. PATENT DOCUMENTS

| 6,047,261 | A | 4/2000 | Siefert |
| 6,049,829 | A * | 4/2000 | Li ................................. 709/229 |
| 6,317,781 | B1 | 11/2001 | De Boor et al. |
| 7,567,575 | B2 * | 7/2009 | Chen et al. .................... 370/401 |
| 2001/0022000 | A1 | 9/2001 | Horn et al. |
| 2001/0047213 | A1 | 11/2001 | Sepe, Jr. |
| 2001/0047517 | A1 * | 11/2001 | Christopoulos et al. ........ 725/87 |
| 2002/0058530 | A1 | 5/2002 | Akama |

(Continued)

FOREIGN PATENT DOCUMENTS

EP 0719062 6/1996

(Continued)

OTHER PUBLICATIONS

Budagavi et al., "Wireless MPEG-4 Video on Texas Instruments DSP CHIPS" 1999 IEEE International Conference on Acoustics, Speech, and Signal Processing, Mar. 15, 1999,vol. 4, pp. 2223-2226.

(Continued)

*Primary Examiner* — Duc C Ho

(57) ABSTRACT

A method for providing multimedia data from at least one controllable multimedia source to a mobile device includes providing a request path from the mobile device to a mobile service platform, receiving a request from the mobile device, obtaining a device profile from the mobile device, authenticating the identity of a user of the mobile device, and determining a user profile in response to the user identity. The method further includes authorizing control and access to the at least one multimedia source, providing a control channel from the mobile service platform to at least one multimedia server, providing multimedia data delivery information to the at least one multimedia server, and providing multimedia data to the mobile device in response to the request via the at least one multimedia server.

19 Claims, 5 Drawing Sheets

U.S. PATENT DOCUMENTS

| | | | |
|---|---|---|---|
| 2002/0120779 A1 | 8/2002 | Teeple et al. | |
| 2003/0001880 A1 | 1/2003 | Holtz et al. | |
| 2005/0086694 A1 | 4/2005 | Hicks et al. | |
| 2006/0080707 A1 | 4/2006 | Laksono | |

FOREIGN PATENT DOCUMENTS

| | | |
|---|---|---|
| WO | 99/31821 | 6/1999 |
| WO | 99/57910 | 11/1999 |

OTHER PUBLICATIONS

H. Rao, Y. Chen, D. Chang, M. Chen, "iMobile: A Proxy-based Platform for Mobile Services", The First ACM Workshop on Wireless Mobile Internet (WMI 2001), Rome, Jul. 2001.

S. John, R. Jana, V. Vaishampayan, A. Reibman, "iVideo—A Video Proxy for the Mobile Internet", Proceedings of IEEE 11th International Packet Video Workshop, Korea, May 2001.

\* cited by examiner

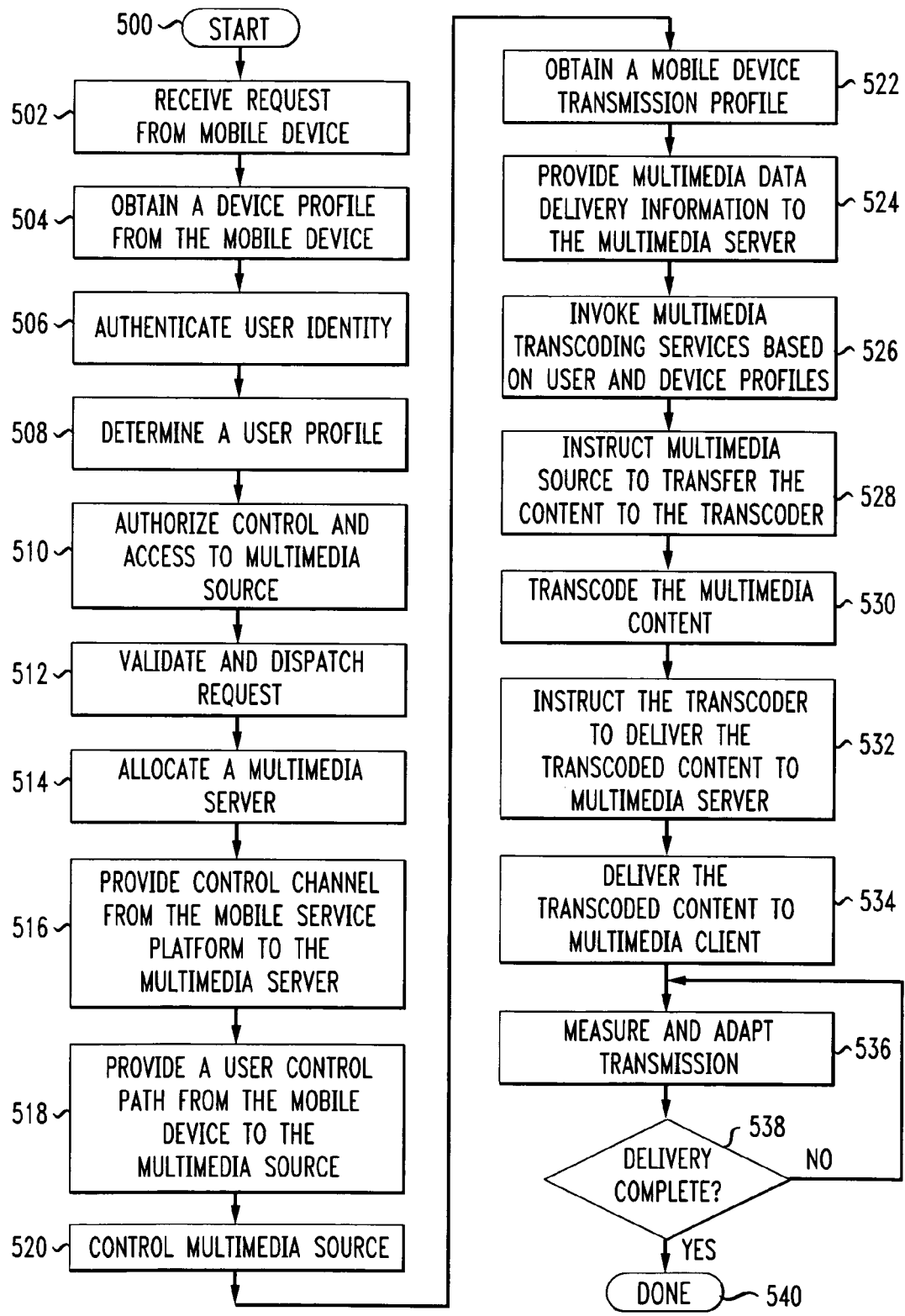

PERSONALIZED MULTIMEDIA SERVICES USING A MOBILE SERVICE PLATFORM

CROSS REFERENCE TO RELATED APPLICATIONS

This application is a continuation of U.S. patent application Ser. No. 10/136,540, filed May 1, 2002, which issued on Jul. 28, 2009 as U.S. Pat. No. 7,567,575, which claims the benefit of U.S. Provisional Application No. 60/317,712, filed on Sep. 7, 2001 which is hereby incorporated herein by reference in its entirely.

STATEMENT REGARDING FEDERALLY SPONSORED RESEARCH

Not Applicable.

FIELD OF THE INVENTION

The present invention relates generally to communication systems and, more particularly, to mobile wireless communication and multimedia delivery systems.

BACKGROUND OF THE INVENTION

As is known in the art, wireless Internet access is different from simply accessing the Internet wirelessly. Mobile wireless users have different needs, motivations and capabilities from typical wireline users. For example, a mobile user is usually in a multi-tasking mode, e.g., accessing the Internet while attending a meeting or shopping in the mall. Typical Internet accesses are bursty in nature (checking stock quotes, weather, or finding a nearby restaurant) and task-oriented. Thus, browser-centric applications and elaborate user interfaces are of limited utility since a mobile user usually carries small devices such as a cell phone or a Personal Digital Assistant (PDA) having relatively small displays. These personalized devices, which are typically identified by a wireless network address such as a cellular phone number, provide mobile users with continuous access to the Internet.

Advances in wireless networking and messaging technologies have given mobile users many choices to access Internet contents and services. Existing devices and protocols include personal digital assistants (PDAs), such as Palm Pilots with Web Clipping, cell phones with wireless application protocol (WAP) or short message service (SMS), e-mail devices, such as Blackberry and AT&T PocketNet, supporting Post Office Protocol 3 (POP3) and/or (Internet Message Access Protocol) IMAP, and America On Line (AOL) Instant Messaging (AIM). In mobile applications, it is often desirable to receive multimedia data on mobile devices.

Multimedia data, for example, uncompressed video typically requires transmission bandwidths of tens of megabits per second, and is thus not suitable for bandwidth-limited environments. Even international standards like ISO JPEG, MPEG1 and MPEG2 are also not well suited to such environments. However, recent compression standards, including ITU H.263, MPEG-4 and the in-progress H.26L are targeted towards "reasonable" quality bit rates as low as about 10 kbps. The standards only specify the structure of the bitstream, while leaving a great deal of flexibility in how an encoder creates a compliant bitstream. To control the bit rate and quality of the multimedia data, the encoder can vary processing of the signal prior to source coding, scale of the quantizer, mode selections and frame rate. The wireless multimedia transcoders (encoder/decoder pairs), for example conventional video transcoders are designed to perform under the following constraints: 1) low spatial resolution, 2) low frame rate and 3) slowly moving and low-detail contents. Some of the system design issues that arise in the wireless environment are data rate minimization, complexity, power consumption and reliability.

Implementation complexity and power consumptions are especially important in the design of portable multimedia terminals. The amount of processing required for decoding, for example video data, is related to the number of frames per second (frame rate) and the total number of pixels in one frame (frame size). Therefore, the frame rate and the frame size need to be adjusted to the processing power of the client device.

Wireless access links suffer from severe transmission conditions, such as narrow bandwidth, higher bit error rates and high latency. One of the wireless environment's distinguishing characteristics is signal fading due to changes in the propagation path as the terminal moves and interference from other terminals in the same cell or from neighboring cells. Reliability is measured by the bit error rate (BER). Typical BERs on mobile wireless channels range from $10^{-2}$ to $10^{-3}$. Thus achieving acceptable reliability requires powerful error detection and correction techniques which are continuously adapted to the changing transmission conditions. Another problem with wireless links is congestion of the control and request channels when these channels are used simultaneously to deliver the multimedia content.

It would, therefore, be desirable to provide personal multimedia services delivered over a wireless communication channel to a variety of mobile device types while minimizing congestion of the control and request paths. It would further be desirable to provide a mobile service platform and separate multimedia servers having distinct channels for delivering transcoded multimedia data and adapting the delivery of the multimedia data to fluctuations of the wireless communication channel conditions. It would also be desirable to enable a mobile user to control multimedia sources.

SUMMARY OF THE INVENTION

The present invention provides a system for providing multimedia data to a mobile device including a mobile service platform for providing communication with a variety of protocols and devices. The mobile service platform provides a message gateway for allowing mobile devices using a range of protocols and access networks to request delivery of multimedia data from a variety of multimedia sources and to control the multimedia sources. The mobile service platform controls a plurality of multimedia servers which provide separate delivery channels to avoid congestion of the message gateway. Additionally, adaptive transcoders are located between the multimedia sources and the multimedia servers to provide a stream of encoded multimedia data for delivery to the mobile devices that adapt to fluctuation in the wireless delivery channel. With this arrangement, the mobile service platform manages the control path, while the multimedia servers handle content delivery. While the invention is primarily shown and described in conjunction with portable mobile devices, it is understood that the invention is generally applicable to systems in which it would be desirable for differing device types and protocols to communicate with each other.

In one aspect of the invention, a method for providing multimedia data from at least one controllable multimedia source to a mobile device includes providing a request path from the mobile device to a mobile service platform, receiving a request from the mobile device, obtaining a device profile from the mobile device, authenticating the identity of a user of the mobile device, and determining a user profile in response to the user identity. The method further includes authorizing control and access to the at least one multimedia source, providing a control channel from the mobile service platform to at least one multimedia server, providing multimedia data delivery information to the at least one multimedia server, and providing multimedia data to the mobile device in response to the request via the at least one multimedia server. With such a technique, personal multimedia services are delivered over a wireless communication channel to a variety of mobile device types while minimizing congestion of the control and request paths, and a mobile user can control multimedia sources over the wireless channel. By routing the control paths through the mobile service platform and the content delivery paths through multimedia servers, the control, transcoding, and multimedia delivery functions are handled efficiently without overloading any particular communications pipe. The inventive technique enables different modes of communication from a multitude of handheld devices for efficient and personalized multimedia delivery.

In a further aspect of the invention, a method for providing multimedia data from a controllable multimedia source to a mobile device includes negotiating a device profile, determining a plurality of encoding parameters, controlling a compressed video stream from the multimedia source, monitoring a decoded bit stream, measuring a transmission parameter, and adjusting the outgoing frame rate, bit rate and frame size in response to the measured transmission parameter. With this technique, the delivery of the multimedia data continuously adapts to fluctuations of the wireless communication channel conditions.

In a still further aspect of the invention, a system for providing multimedia data to a mobile device includes a mobile service platform having an authentication processor adapted to authenticate user command requests from the mobile device, and a multimedia source controller adapted to receive the authenticated user command requests for controlling at least one multimedia source. The system further includes at least one multimedia server adapted to receive control commands from said mobile service platform, and at least one transcoder adapted to receive multimedia data from the at least one multimedia source and coupled to the at least one multimedia server. Such an arrangement provides a mobile service platform and separate multimedia servers having distinct channels for delivering transcoded multimedia data.

In one embodiment, a mobile service platform provides personalized multimedia services, which enable a mobile user to remotely record multimedia programs, control cameras, and request the delivery of pre-recorded or live multimedia content to his or her own mobile device. The mobile service platform authenticates users who send service requests from various mobile devices, directs a transcoder to transcode multimedia content based on user, device, and transmission profiles, and authorizes the delivery of multimedia content from a plurality of media servers to the proper mobile device over wireless LAN and Cellular Digital Packet Data (CDPD) networks. The multimedia servers adapt automatically to the fluctuations of the wireless channel conditions to provide, for example, reasonable viewing of video on the mobile device. The mobile service platform essentially manages the control path, while the media servers handle the actual content delivery.

BRIEF DESCRIPTION OF THE DRAWINGS

The invention will be more fully understood from the following detailed description taken in conjunction with the accompanying drawings, in which:

FIG. 5 is a flow diagram illustrating the steps for providing multimedia data to a variety of mobile devices in accordance with the present invention.

DETAILED DESCRIPTION OF THE INVENTION

In general, the present invention provides personalized multimedia service by integrating a mobile service platform, and a plurality of multimedia servers for wireless multimedia delivery. The mobile service platform operates as a message gateway for allowing mobile devices using various protocols on different access networks to access multimedia resources on the Internet and various other networks. The mobile service platform includes a flexible architecture having a plurality of components that cooperate to service mobile device service requests.

Before providing a detailed description of the invention, it may be helpful to define some of the terms used in the description. As used herein, the term "personalized multimedia service" refers to a service that enables a mobile user to remotely control multimedia sources, and request the delivery of multimedia content to a mobile device. Additionally, the service can provide access to personal "play lists" of multimedia content and authorized multimedia sources, and the service can adapt the format of the multimedia delivery to personal preferences. The multimedia service is further personalized by the customized seamless delivery of related multimedia material based upon the mobile user's profile.

Although the terms frame rate, frames per second, refresh rate, and display size, generally refer to video data, as used herein these terms apply generally to other types of multimedia data such as audio, and reflect similar controllable transmission parameters such as the sample rate.

As described more fully below, authentication refers to the process of verifying the mobile user's identity as service requests are received from various communication channels and authorization refers to the process of determining which users can control what multimedia sources and which users can request delivery of multimedia content from these sources. As used herein, transcoding refers to the process of decoding and encoding multimedia content, transforming the original content for delivery to mobile devices having different capabilities over communication channels having varying bandwidths, and adaptation refers to the process of handling dynamic fluctuations in wireless channel conditions by modifying the transcoding process.

Figure 1:
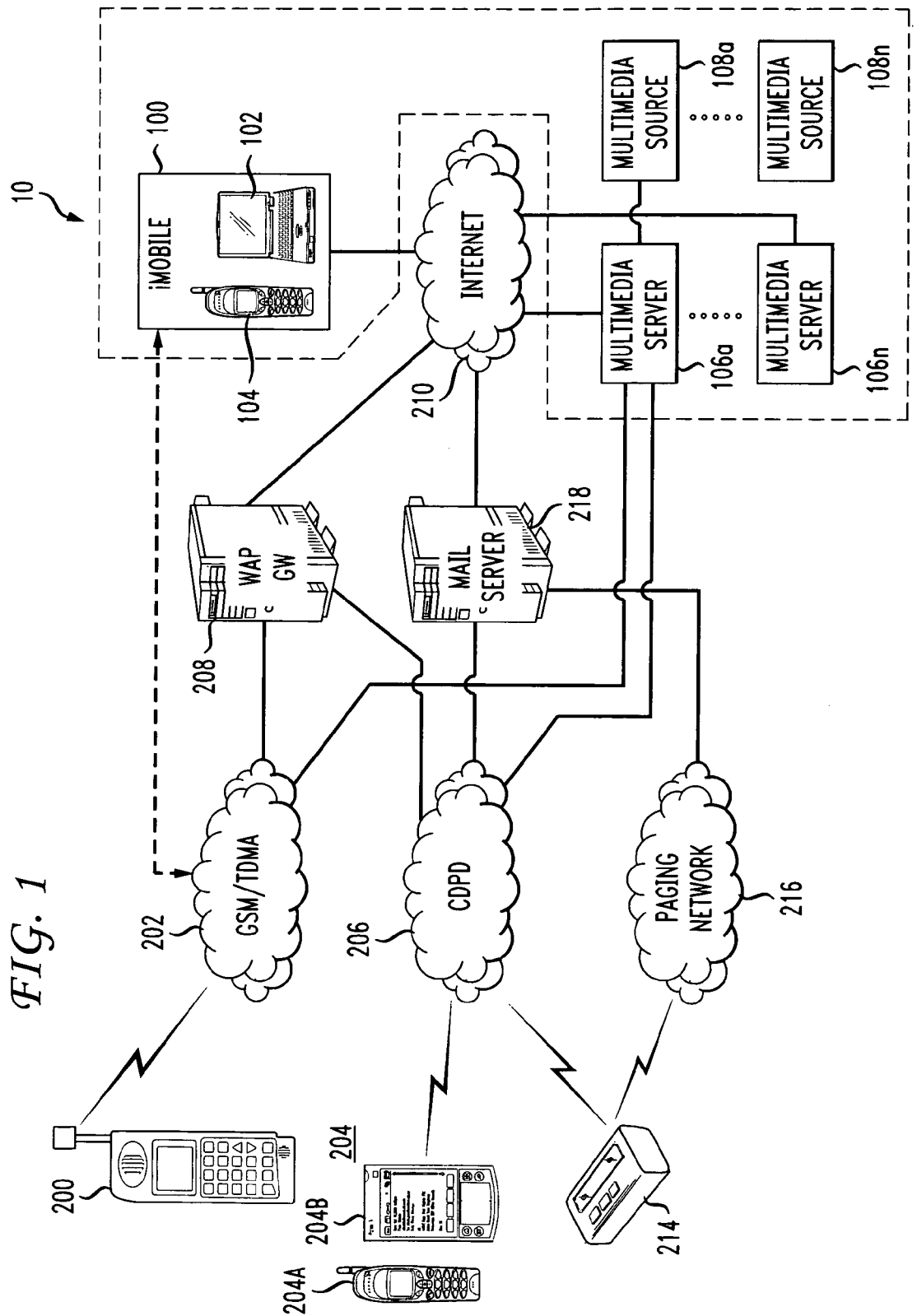
FIG. 1 is a schematic depiction of a system for providing multimedia data to a variety of mobile devices in accordance with the present invention.

FIG. 1 shows an exemplary embodiment of a personalized multimedia services system 10 for enabling mobile users to receive multimedia data from a variety of multimedia sources using various protocols in accordance with the present invention. The system 10 also enables the mobiles users to control aspects of the operation of the multimedia sources. The system 10 includes a mobile service platform 100 which can run on a computer 102 having connections to a plurality of networks and devices. The mobile service platform 100 further includes a wireless device 104 for receiving and transmitting data via wireless communication. The mobile phone device 104 can support Short Message Service (SMS) communication, which is well known to those skilled in the art. While shown as a wireless phone coupled to the computer, it will be readily apparent to one of ordinary skill in the art that mobile service platform functionality can be readily integrated into a single device. In addition, the mobile service platform 100 can include a number of wireless devices, which can be the same or different type, coupled to the computer 102. The system 10 further includes a plurality of multimedia servers 106a-106n (generally referred to as multimedia server 106) which are adapted to receive multimedia data from a plurality of multimedia sources 108a-108m (generally referred to as multimedia source 108).

It is understood that the mobile service platform 100 and the multimedia server 106 can operate on a variety of known computers and operating systems, such as Unix and Windows. In one embodiment, the mobile service platform 100 and the multimedia server 106 is implemented using the Java programming language running in a Windows environment.

The mobile service platform 100 and the multimedia server 106 communicate with various mobile devices and networks. In the illustrated embodiment, a cell phone 200 with two-way short messaging service (SMS), e.g., a Global System for Mobile Communication/Time Division Multiple Access (GSM/TDMA) phone connected to a GSM/TDMA network 202, can communicate with the mobile service platform 100 through an SMS driver hosted on the mobile device server. Cellular Digital Packet Data (CDPD) devices 204, such as AT&T PocketNet phone 204a and Palm V 204b, coupled to a CDPD network 206 can use a Wireless Access Protocol (WAP) gateway 208 to access the mobile service platform 100 through the Internet 210. E-mail devices 214, such as a Blackberry mobile device, can use the Standard E-mail Protocol (SMTP) on the CDPD network 206 or a two-way paging network 216 coupled to a mail server 218 to communicate with the mobile service platform 100. The multimedia server 106 can deliver multimedia data to the mobile devices 200, 204 and 214 through the CDPD network 206, the Wireless Access Protocol (WAP) gateway 208 and the paging network 216.

In addition, PC device users and some PDAs can use AOL Instant Messenger (AIM) or web browsers to communicate with the mobile service platform 100, which can support a Transmission Control Protocol (TCP) interface. Mobile devices can include an embedded module for communicating with the mobile service platform 100 directly via the TCP interface. The mobile service platform 100 can receive messages and commands from these devices, access Internet services and information on behalf of a mobile user, and relay messages or Internet content back to the sending devices or other devices.

The mobile service platform 100 includes an architecture having a plurality of interface, logic, and access components that enable the mobile service platform to communicate with a range of devices, protocols and information spaces. This arrangement hides the complexity of multiple devices and content sources from mobile users. The mobile service platform 100 can include a proxy server that provides an environment for hosting agents and personalized services, which can be implemented as reusable building blocks in the Java programming language, for example. An exemplary proxy server known as iProxy, is shown and described in U.S. patent application Ser. Nos. 08/974,600, filed on Dec. 19, 1997, and 09/474,914, filed on Dec. 30, 1999, which are incorporated herein by reference. In general, an iProxy agent, which can include a web-server, can be invoked like a regular common gateway interface (CGI) program. The iProxy system also allows scripts embedded inside web pages to invoke agents to perform specialized processing. The iProxy system maintains user profiles and adds intelligence to the traditional HTTP proxy server to provide personalized, and value-added services such as filtering, tracking, and archiving.

Figure 2:
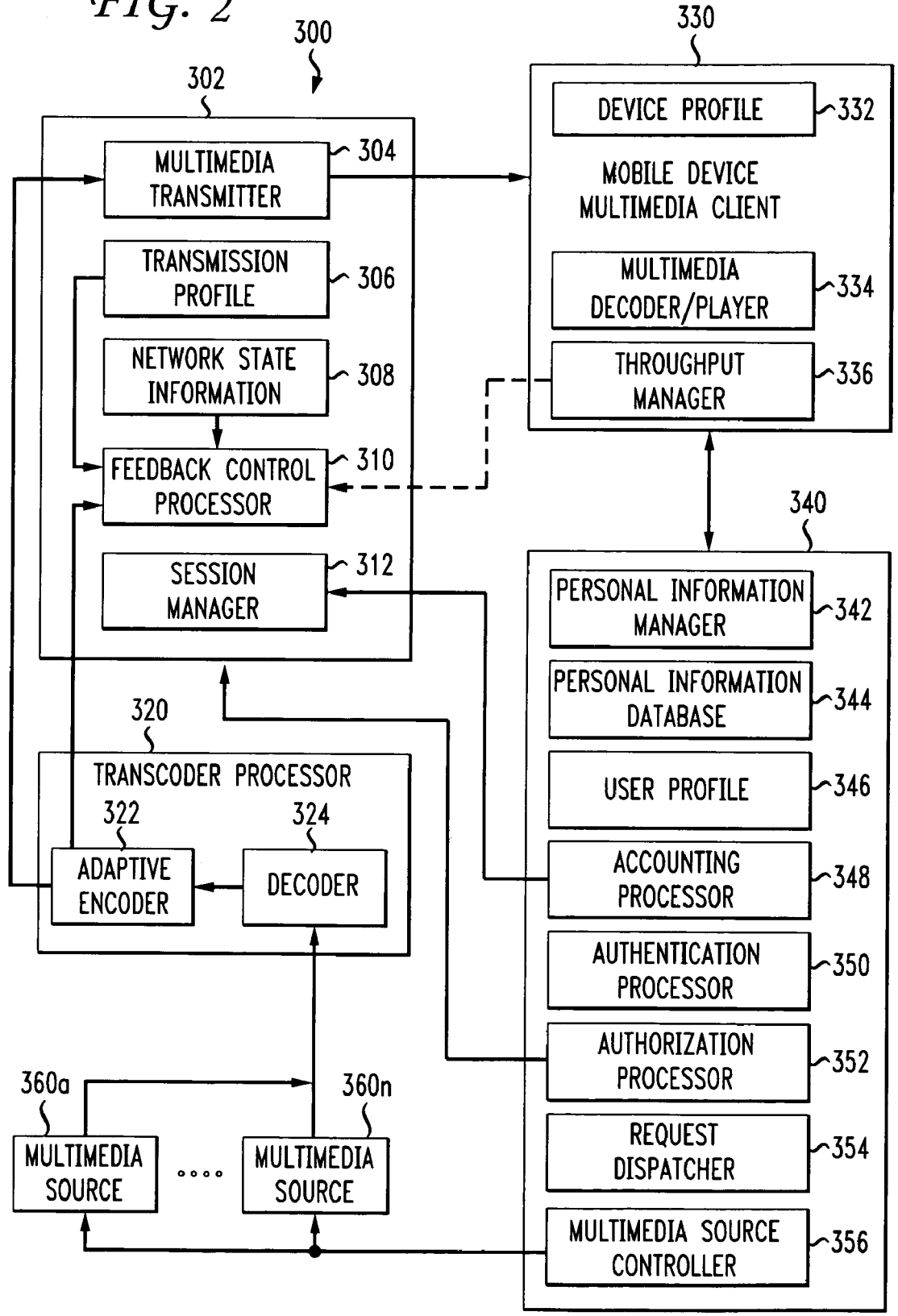
FIG. 2 is a schematic block diagram of an exemplary architecture for the system of FIG. 1.

FIG. 2 shows an exemplary architecture for a personalized multimedia services system 300, which is similar to the system 10 of FIG. 1, having a plurality of components that combine to provide a flexible architecture that delivers multimedia data through a plurality of multimedia servers and interacts with a user of a mobile device through a separate mobile service platform to provide personalized services. The system 300 includes a mobile service platform 340 having a personal information management processor 342 adapted to obtain information from a personal information database 344 and a user profile 346, a request dispatcher 354 adapted to receive data requests and user command requests (collectively referred to as service requests) from a multimedia client 330 of a mobile device. The mobile service platform 340 further includes an authentication processor 350 coupled to the request dispatcher 354 and adapted to obtain personal information from the personal information database 344 and to provide information for the user profile 346, an authorization processor 352 coupled to the request dispatcher 354, a multimedia source controller 356 coupled to the plurality of multimedia sources 360 and an accounting processor 348.

The system 300 also includes a multimedia server 302 which includes at least one multimedia transmitter 304, a feedback control processor 310 and a session manager 312. The session manager 312 is coupled to the accounting processor 348. The feedback control processor 310 accesses a transmission profile 306 and network state information 308. The system 300 further includes a transcoder processor 320 (also referred to as transcoder 320) having an adaptive encoder 322 which is coupled to the feedback control processor 310 and to the multimedia transmitter 304, and a decoder 324 which is coupled to one or more multimedia sources 360a-360n (generally referred to as multimedia sources 360).

The system 300 further includes a multimedia client 330 having a device profile 332, a multimedia decoder/player processor adapted to receive multimedia data from the multimedia transmitter 304 over a wireless link, and a throughput manager 336 coupled over the wireless link to the feedback control processor 310.

The blocks denoted "processor," "platform," "player," "client," "dispatcher" and "manager" can represent computer software instructions or groups of instructions. Such processing may be performed by a single processing apparatus which may, for example, be provided as part of a sever, a mobile device controller, or set top boxes.

In one embodiment, mobile service platform 340 is, for example, similar to an iMobile system which is shown and described in more detail in pending U.S. patent application Ser. No. 10/037,570 which is incorporated herein by reference.

The multimedia server 302 and transcoder 320 automatically adapt the multimedia transmission to compensate for the fluctuations of the wireless channel conditions for maintaining a viewable display on the mobile device. Each mobile device that communicates with the mobile service platform 340 and multimedia server 302 registers its device profile information with the mobile service platform 340. Device profiles 332 include information for user devices, such as how much information can be displayed. A device name is designated by protocol and account ID, i.e., protocol:acct_id. For example, an AIM user webciao is named aim:webciao. The mobile service platform 340 maintains a default device profile 332 for each device type, and each mobile device can update that profile with device-specific information. The device profile 332 can, for example, be a list of attribute-value pairs. One attribute is dev.format.accept, which determines what MIME type the device is allowed to accept. This information is used by the system 300 in addition to the transmission profile 306 to transcode original content to a format appropriate for this device, as described above. The transmission profile describes the protocol of the wireless channel environment. For example, Cellular Digital Packet Data (CDPD) or WLAN (802.11) protocols have substantially different bit rates and as a result need media adaptation when traversing between network boundaries. The transmission profile can include a modeled transmission profile and a measured channel transmission profile. The measured channel transmission profile can include an estimated available bandwidth quality of service measurement and a link delay measurement.

In general, each device is mapped to a registered user of the mobile device server. This mapping arrangement enables limiting access to legitimate users of the mobile device server, and personalizing a service based on the user profile. An illustrative device-to-user map stored in the user profile 346 for a particular user on the mobile service platform 340 is set forth below:

sms:+886935551826=herman
sms:+19085556842=chen
mail:dchang(research.att.com=difa (an alias)
aim:webciao=chen.

It is understood that the mobile service platform 340 of the present invention can rely upon a variety of authentication techniques. Since the mobile service platform 340 interacts with multiple networks and protocols, the server relies on different authentication mechanisms. In one embodiment, the mobile service platform 340 uses the cell phone identification on wireless phone networks, AOL buddy names on the AIM network, and generic user ID and password information for WAP, HTTP, and telnet clients. However, the mobile service platform 340 does not have control over the security afforded by some of these networks. Alternative embodiments can include the SSH Secure Shell to provide end-to-end authentication services. In general, the technique used by the mobile service platform 340 to authenticate a mobile user depends on the device or protocol used. Trusting wireless networks, such as Voicestream/GSM and AT&T TDMA networks, to provide the correct cell phone id when a short message (SMS) is received is generally acceptable unless a cell phone is stolen and the user did not lock the phone with a security password. The mobile service platform 340 can also generally trust the AOL network authentication for non-critical services. User authentication through the mobile service platform 340 itself is required if the user accesses the mobile service platform 340 through telnet, WAP, or HTTP. The following is an example of a user profile:

name=Robin Chen
password=xf2gbH3
default=$mail.1
my addresses
sms.1=sms:+19085556842
mail.1=mail:chen@research.att.com
mail.2=mail:imobile@mobile.att.net
mail.all=$mail.1,$mail.2
aim.1=aim:webciao
command aliases
sms.cmd.q=quote
sms.cmd.sn=sitenews
address aliases
sms.addr.cc=aim:chrischen.

Where sms.1 is an sms identifier, and is here a phone number;
sms.cmd.q=quote indicates that q is an assigned shortcut for quotes; and
cc is an assigned shortcut for the AOL instant messenger ID chrischen.

The user profile 346 stores the user name, password, and a list of the devices that the user registers with the mobile device server. It also stores command and address aliases. When a user accesses the mobile service platform 340 through AIM using the id webciao, the mobile service platform 340 determines from the user-device map that the user is chen and uses the user profile chen.ini for all later service requests from this device. For example, the following short message sent from a GSM phone: "forward $mail.1 q T" is interpreted as "forward mail:chen@research.att.com quote T" according to the user profile. The special character "$" requests that the mobile service platform 340 map the named device, i.e., mail.1, to its corresponding entry in the profile. The transmission profile 306 includes for example entries specifying the protocol of the wireless channel in the following format:

dev.txprofile=wlan; or alternatively
dev.txprofile=cdpd;
where wlan indicates a protocol such as 802.11; and
cdpd indicates a Cellular Digital Packet Data protocol.

In operation, the multimedia client 330 is started on a mobile device such as an iPAQ mobile wireless device manufactured by Compaq Computer Inc., and contacts the mobile service platform 340 to identify the mobile device with the corresponding multimedia client 330. This can be done in several ways. For example, the iPAQ supplies an IP address of the mobile device. There is a separate mechanism to keep track of which IP addresses belong to which mobile server platform 340 user. The mapping, for example, is stored in the iMobile user-device map: ip:135.22.102.22=chen. Attributes of this iPAQ device/multimedia client can be specified in the device profile. For example, dev.format.accept=video/h.263; indicating that the device accepts the H.263 protocol; and
dev.size=128×96; indicating the display size of the device.

Upon activation, the client proxy negotiates its device profile with the mobile service platform 340. The device profile includes the display size, audio-visual decoding capability and the CPU processing power.

The system 300 is designed to provide personalized mobile services with the help of the personal information management processor 342 which retrieves personal information such as user preferences from the personal information database 344. The transcoder processor 320 applies continuously updated transcoding to each multimedia stream enabling transmission under different communication operating conditions.

When the multimedia client 330 is ready to retrieve a pre-recorded video such as cnn-news, the mobile service platform 340 examines the device profile 332 and transmission profile 306 and determines that transcoding from MPEG2 to H.263 on the VCR server is necessary. The mobile server platform 340 then instructs the VCR server to move the transcoded content to the multimedia server and instructs the multimedia server to deliver the content to the multimedia client at IP address 135.22.102.22.

In one embodiment, transcoding using the International Telecommunication Union (ITU) H.263 video compression standard for enhanced reference picture selection mode is performed on each MPEG2 file right after it is recorded. H.263 is a popular format used by wireless multimedia devices. Transcoding includes decoding the MPEG2 file and re-encoding the data using H.263. In this embodiment, the transcoder uses an MPEG2 decoder based on the MPEG Software Simulation Group (MSSG), a resolution transformer, transforming from varied picture size to quarter common intermediate format (QCIF) with smoothing.

The multimedia client 330 decodes the incoming multimedia stream and forwards it to the display unit. Typical display devices include but are not limited to handheld computers (Windows CE environment), personal digital assistants (e.g. Palm Pilots) and multimedia phones. The multimedia client 330 may also include private labeling or inject annotations to the decoded stream. Monitoring the decoded bit stream is accomplished at the application layer. The multimedia client 330 throughput manager 336 maintains a running average of the streamed bytes and measures the download throughput. The throughput manager 336 notifies the feedback control processor 310 in the multimedia server 302 of the current throughput. In response to the throughput measurement and the network state information 308, the feedback control processor 310 commands the transcoder 320 to adjust the outgoing frame rate accordingly. The multimedia client 330 is also responsible for collecting various profile information and sending the information to the mobile service platform 340.

The multimedia server 302 includes the session manager 312 which controls the generation of the compressed multimedia stream from various multimedia sources. The feedback control processor 310, based on measured throughput feedback, decides on a set of encoding parameters appropriate for each user. In an embodiment in which video data is delivered to the mobile device these parameters include the encoding bit rate, the frame format, the frame size and the quantization table. It will be appreciated by those of ordinary skill in the art that similar encoding parameters including compression ratios are adjusted for other forms of multimedia and protocols. Examples include image media such as GIF, JPEG and PNG; audio media such as Real Audio, wav, au; and video files such as Quicktime, MPEG, and Motion JPEG.

The encoding bit rate parameter acts as a reference for the transcoder. The encoding parameters supplied to the adaptive encoder 322 are continually adjusted such that deviation between the output frame rate and the reference frame rate is minimized. For video data, the frame format switching is determined by estimating the display size and the processing power of the client device. By adaptively encoding the multimedia data, the system performance degrades gracefully in the presence of errors, unexpected changes in operating conditions such as overload, network congestions or abrupt variations in the end-to-end throughput due to client mobility.

Further details on a specific implementation of an exemplary multimedia server (referred to as iVideo) can be found in S. John, R. Jana, V. Vaishampayan, A. Reibman, "iVideo—A Video Proxy for the Mobile Internet", Proc of IEEE 11$^{th}$ International Packet Video Workshop, Korea, May 2001.

Figure 3:
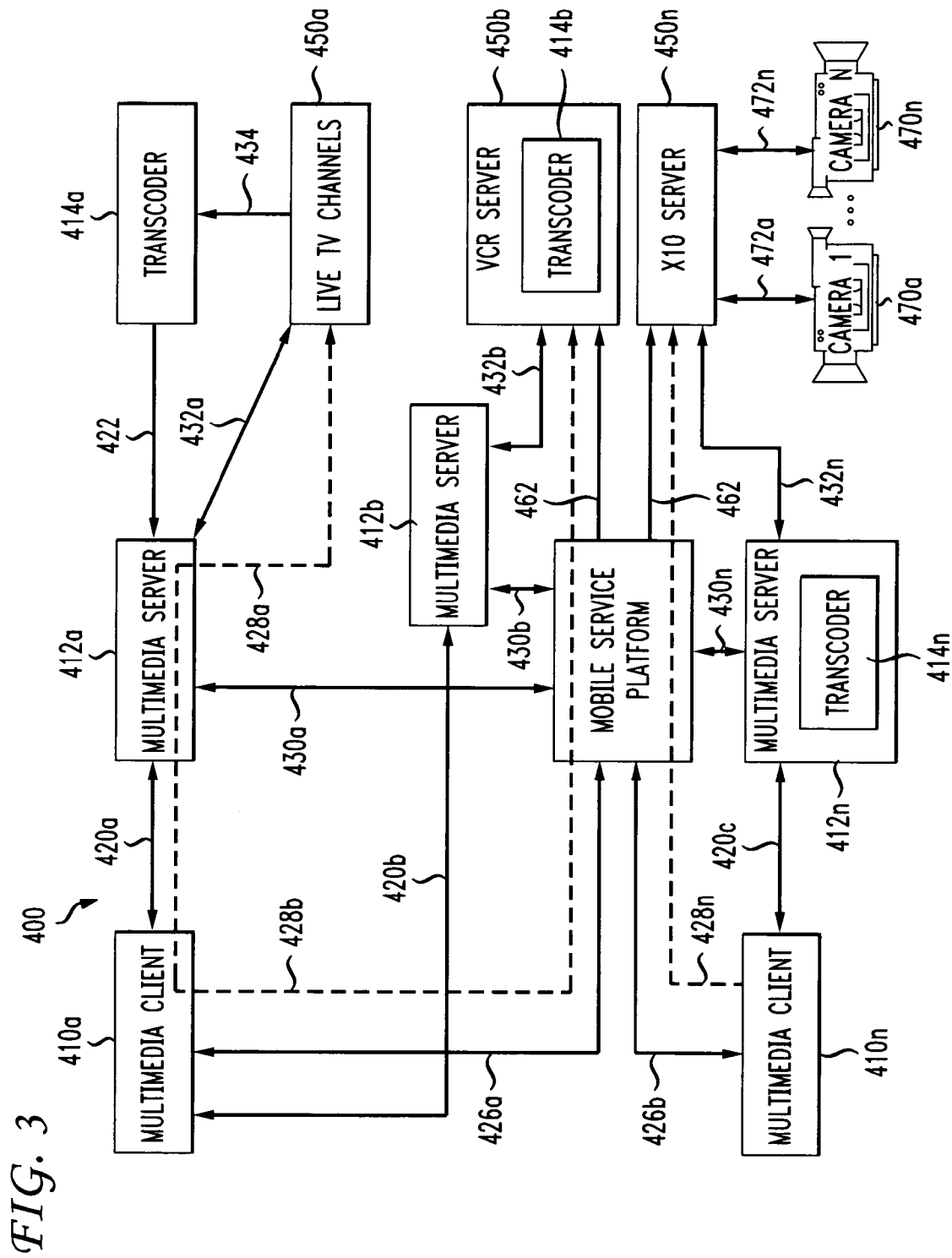
FIG. 3 is a schematic depiction of an exemplary communication path configuration for a system for providing multimedia data to a variety of mobile devices in accordance with the present invention.

FIG. 3 shows a plurality of data and control pathways in a communication path between mobile devices and an exemplary personalized multimedia services system 400 in accordance with the present invention. The system 400 includes a plurality of multimedia clients 410a-410n (generally referred to as multimedia clients 410) which operate on the mobile devices (not shown) and communicate with a plurality of multimedia servers 412a-412n over wireless channels 420a-420n respectively. The multimedia clients 410 communicate with a mobile service platform 460 over wireless channels 426a-426n and control a variety of multimedia sources, for example, a multimedia source 450a, here a source of live TV channels, a multimedia source 450b, here a VCR server, and multimedia source 450n, here an X10 server, over logical channels 428a-428n (generally referred to as logical channels 428). The logical channels 428b and 428n operate over physical channels 462 from the mobile service platform 460 to the multimedia sources 450b and 450n. The mobile service platform 460 is coupled to the multimedia servers 412 over communications channels 430a-430n. The plurality of multimedia servers 412a-412n are coupled to the corresponding plurality of multimedia sources 450a-450n over physical links 432a-432n respectively. Additionally, the logical channel 428a used for controlling the multimedia source 450a can be supported over the physical link 432a from the multimedia server 412a to multimedia source 450a.

The system 400 also includes a plurality of transcoders 414a-414n (generally referred to as transcoder 414) coupled between the multimedia sources 450 and the corresponding multimedia server 412. As a function of the multimedia source and a network configuration, the transcoder 414 can be a stand-alone transcoder, for example, transcoder 414a coupled to multimedia server 412a over channel 422 and coupled to the multimedia source 450a over channel 434. The transcoder 414 can also be, for example, a transcoder 414b which is integrated with the multimedia source 450b. Finally the transcoder 414, can be integrated into the multimedia server 412, for example, multimedia server 412n including transcoder 414n which is coupled to multimedia source 450n over the channel 432n. Multimedia source 450n is coupled to a plurality of video cameras 470a-470n over channels 472a-472n respectively.

It will be appreciated by those of ordinary skill in the art that particular channels described above in certain embodiments are wireless channels and in alternate embodiments are hard wired channels using one or more communications protocols and networks.

As described above, the location of transcoders 414 are arranged to provide efficient use of hardware and network bandwidth resources. The transcoders 414 are arranged as a function of supported media types and user preferences based on the client decoding capabilities, and are generally located either within a multimedia server 412, as a stand-alone resource, or within a multimedia source, for example multimedia source 450b.

The mobile service platform 460 controls aspects of the operation of the multimedia servers 412 over communications channels 430a-430n. The protocol used for communication between the mobile service platform 460 and each of the multimedia servers 412 can include a proprietary protocol that uses signaling based on TCP/IP communications. Alternatively a standards based signaling scheme such as the media gateway control protocol, (MGCP) or real time control protocol (RTCP)

The multimedia servers 412 provide a channel 432 to the multimedia source and separate channels 420 to deliver multimedia content to the multimedia clients 410 while adaptively controlling the data transmission to adjust automatically to wireless transmission conditions. By using channels 420, congestion on the request channels 426 from the multimedia clients 410 to the mobile service platform 460 is minimized.

Figure 4:
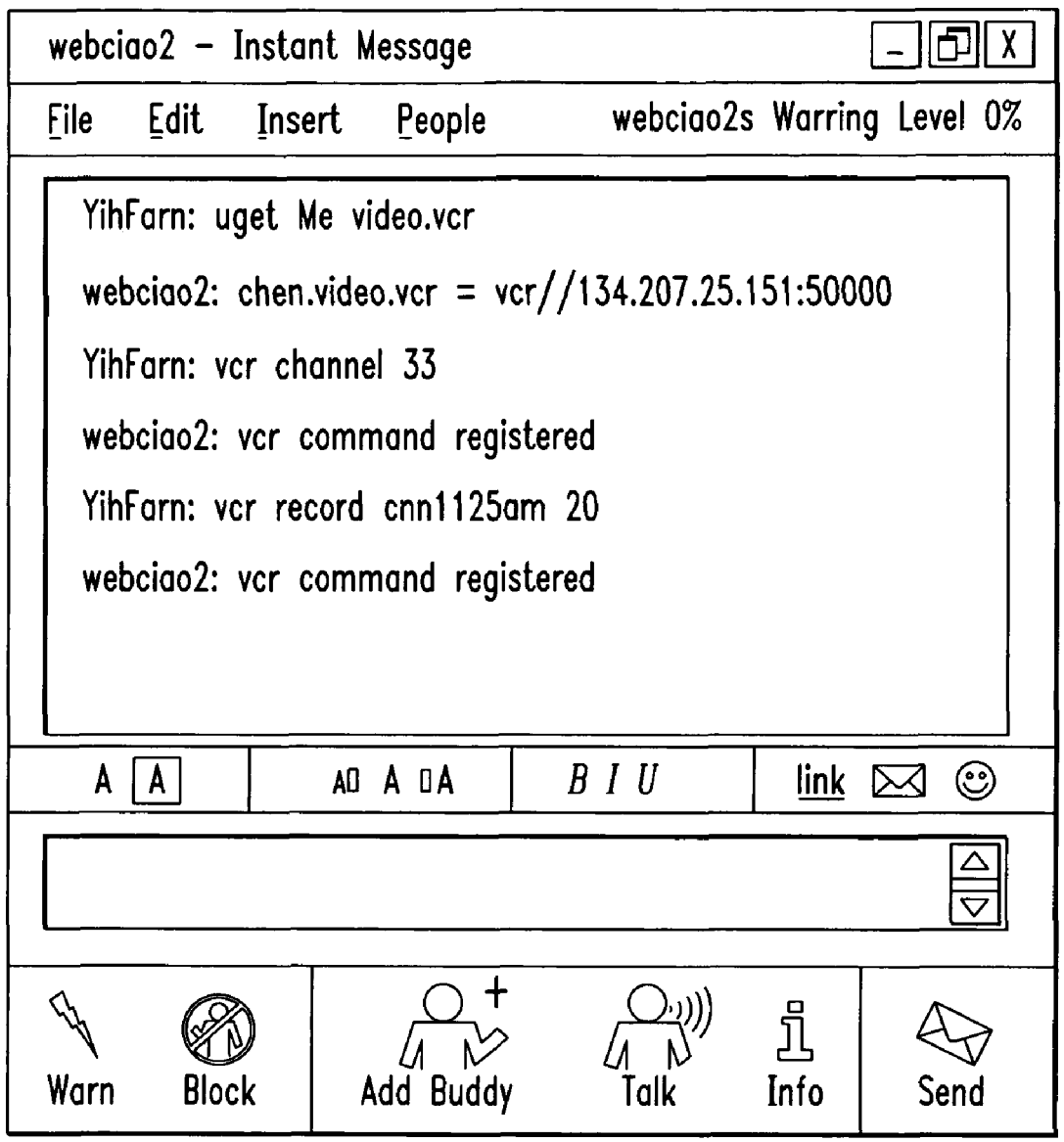
FIG. 4 is an exemplary screen display for a mobile device controlling a VCR through AOL Instant Messenger in accordance with the present invention.

Now referring to FIG. 4, in which like reference numbers indicate like elements of FIG. 3, an illustration of a display of a mobile device, shows control of a multimedia source 450b, here a VCR server which includes transcoder 414b, here an MPEG-2 encoder. The multimedia source 450b is coupled to multimedia server 412b which is coupled to a multimedia client. The multimedia client 410a has a daemon (background software module) which communicates with the mobile service platform 460 to accept control commands in response to service requests. From the mobile user's point of view, the multimedia content is delivered by the multimedia server 412b operating as a controllable VCR connected to a network. The mobile user can change the channel, record the multimedia stream, and select a recorded multimedia stream for display. In an embodiment where the system 400 includes an iMobile device server, these service requests can be issued through a new iMobile infolet called "vcr."

After authentication over channel 426a to the mobile service platform 460, the mobile user controls the recording of video from the mobile device. The mobile service platform 460 determines which multimedia sources can be controlled by which users. If a multimedia recording server at port 50000 of a machine at 135.207.19.231 is operated for a particular user "chen," then the following information is registered in his user profile before mobile server platform 460 issues the recording command through a TCP connection to the multimedia server:
video.vcr=vcr://135.207.19.231:5000
The user can then send the following vcr requests:
  vcr channel 33
  vcr record cnn-news 20
These user command requests instruct the VCR server 450b to switch to channel 33 (the CNN channel on this VCR) and record 20 seconds of the program and store it in the file called cnn-news in the standard MPEG2 format under the user's space. Here, the MPEG2 file has to be compressed to a suitable media format for delivery to the end user. The control signals issued from the end user travel via the mobile service platform 460 to the VCR server 450b. In this example, transcoding is needed to transcode MPEG2 to MPEG4 or other media types based on personal preference or the multimedia client's 410a decoding capabilities.

FIG. 4 shows these remote control commands during an instant messaging session, which can easily run on most PDA's with wireless modems or AOL mobile communicator, a two-way pager, for example, a Blackberry e-mail device such as the Research In Motion RIM 950. The first instant message confirms that the user is allowed to control that multimedia server. The other two instant messages send the service requests.

In one particular embodiment, the multimedia source 450a includes an ATI All-in-Wonder video card which captures TV programs and has an output connected to the input of a transcoder 414a, here a FutureTel MPEG-2 encoder. The control of the TV tuner is implemented by simulating keyboard events over logical channel 428a. For the control of the MPEG encoding process, a PrimeWare USDK is used to control the transcoder 414a. Multimedia data streams are stored in memory buffers in the transcoder and sent to the multimedia server 412a remote machines for streaming to the multimedia client 410a. The multimedia data streams can also be saved to local disks situated at the multimedia server. A mobile device user can specify the channel, starting time, and duration of the TV program. The multimedia server 412 can save the multimedia stream into a file and the mobile device user can later retrieve and display the multimedia content on mobile device.

Similarly, if a user would like to control X10 cameras in his backyard, the mobile service platform 460 needs to know that the user is authorized to control devices connected to the X10 server of that house through the X10 home network. If the X10 server is listening to the mobile service platform 460 at port 1010, the following should be recorded in the user profile:
x10.house.1=x10://135.207.25.147:1010

Several X10 cameras can be used on the X10 home network, but each X10 video receiver can only receive one video source at any point of time to avoid signal interference. Each X10 camera can be addressed by a letter id followed by a numeric id. For example, two X10 cameras (a4, a7) can send their video signals to the same X10 receiver. This set can be defined in the user profile as "set.cam" by the following:
  x10.set.cam=a4,a7
In this example, the camera a4 views a front door while the camera a7 looks at a garage, the mobile user can switch between either one by simply sending the following requests:
  rx10 cam a4 on
  rx10 cam a7 on.

The first request "rx 10 cam a4 on" causes mobile service platform 460 to contact the x10 server running at the user's house, turns on camera a4, and turns off all other cameras in the same group that share the same receiver. Once a video source such as a recorded TV program or a live X10 camera becomes available, mobile server platform 460 can signal a multimedia server 412n to deliver the video in the right format as transcoded by transcoder 414n to an authorized mobile device's multimedia client 410n over wireless channel 420n.

In one particular example, a mobile user in Seattle is able to control cameras and video recording in New Jersey and view a remote office at 2-3 frames per second live using an iPAQ and a CDPD modem. In another example, over a wireless LAN environment based on the 802.11b protocol, a mobile device can receive video at 20 frames per second or above on a similar iPAQ with a WaveLan modem from Lucent.

Now referring to FIG. 5 in which like reference numbers indicate like elements of FIG. 2, a flow diagram illustrates an exemplary process for delivering multimedia content over separately controllable multimedia servers to a mobile device in accordance with the present invention. It is understood that the rectangular elements are herein denoted "processing blocks" (typified by element 502 in FIG. 5) and represent computer software instructions or groups of instructions. The diamond shaped elements in the flow diagrams are herein denoted "decision blocks" (typified by element 538 in FIG. 5) and represent computer software instructions or groups of instructions which affect the operation of the processing blocks. The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

At step 502, the mobile service platform 340 (FIG. 2) receives a request from mobile device over a wireless request path. The request can be formatted, for example, using an HTTP protocol; an instant messaging protocol, a WAP protocol; an SMS protocol, an e-mail protocol, a user defined control signal transported on a TCP/IP protocol, and a user defined control signal transported on a UDP/IP protocol format. The request can include a request for data delivery and can optionally include a request to control a multimedia source.

At step 504, the mobile service platform 340 obtains a device profile from the mobile device. The profile is provided from a user agent of the multimedia client 330, for example, a mobile device microbrowser agent. The mobile service platform 340 device also supports a W3C standard composite capability preference profile (CC/PP) which facilitates the exchange of device capabilities with the mobile service platform 340. As part of a user provisioning process, i.e., the new user installation process, each user specifies the device type of the mobile device and the "default" transmission protocol, i.e., CDPD or 802.11, of the mobile device.

At step 506, the mobile service platform 340 authenticates the identity of a user of the mobile device. The authentication can be accomplished, for example, by using a password, a biometric, or other means which are known in the art.

At step 508, the mobile service platform 340 retrieves a user profile in response to the user identity from the personal information database. The user profile provides information which allows the delivery of personalized services, for example, multimedia source preferences, multimedia play lists, and downloadable video clients for a particular multimedia format.

At step 510, the mobile service platform 340 authorizes control and access to one the multimedia source if the user has permission to retrieve data and control the data source. At step 512, the mobile service platform 340 validates and dispatches the user request. In one embodiment in which the mobile service platform 340 includes the iMobile device server, and the device server invokes applets and infolets to process the request. At step 514, the mobile service platform 340 allocates a multimedia server 302. The allocation is based on the availability, capabilities, and connectivity of the multimedia server 302. Additional multimedia servers 302 may also be allocated to balance the load of the currently operating multimedia servers 302 and also to balance the load on authoritative domains. As part of the user profile, the multimedia server 302 allocation can be predetermined. Similar to cable TV program selection, each user has access to multiple multimedia servers 302 which can deliver content from multiple multimedia sources 360. If a multimedia source 360 is served by multiple multimedia servers 302, one of the multimedia server 302 can be allocated, for example, by random selection.

At step 516, the mobile service platform 340 provides a control channel from the mobile service platform 340 to the allocated multimedia server 302. This channel is used to direct the allocated multimedia server 302 to deliver the multimedia content to the mobile device over an adaptive wireless path. Therefore the request paths from the mobile service platform 340 to the mobile devices is not congested with multimedia content delivery which is allocated over the plurality of multimedia servers 302 if multiple channels of multimedia content are being delivered.

At step 518, if control of the multimedia source is authorized and requested, the multimedia source provides a logical control path from the mobile device through the mobile service platform 340 to the multimedia source 360. In certain application, the logical control path is directed through the multimedia server 302.

At step 520, the multimedia control command, if provided, is used to control the multimedia source 360. It is possible to terminate the request with the command if no data delivery is requested. Processing continues at step 522, where the mobile service platform 340 obtains a mobile device transmission profile 306 to be used by the transcoder 320 and the multimedia server 302 for adapting the data transmission to the mobile device. In one embodiment, it is assumed that the user is knowledgeable enough to know the download bit rate (i.e. 56 kbps for a dial up connection, 19.2 kbps for CDPD, and 100-1000s kbps for WLAN). Alternatively Internet protocol (IP) packets can be pushed to the end mobile client to probe the available bandwidth prior to initiating download of the media stream. The adaptation occurs periodically to update the status of the encoding bit rate and frame rate and encoding quantization step size. Initially, the transmission profile provides a conservative estimate of the bit rate.

At step 524, the mobile service platform 340 provides multimedia data delivery information to the multimedia server 302, and at step 526, the multimedia server 302 invokes multimedia transcoding services based on user profile 346, device profile 332 and the transmission profile 306. It should be noted that the transcoder 320 location is independent of the location of the mobile service platform 340 unless the transcoder 320 and the mobile service platform 340 reside on different authoritative domains.

At step 528, multimedia source controller 356 instructs multimedia source 360 to transfer the multimedia content to the transcoder 320. At step 530, the transcoder 320 transcodes the multimedia content according to the device profile 332 and the transmission profile 306. Prior to re-encoding of the multimedia source the request dispatcher 354 instructs the transcoder 320 to setup a connection between itself and the transmitter 304, indicated by a multimedia transmitter IP address and port number. The transmitter is capable of supporting multiple clients by virtue of allocating each user a unique port number.

At step 532, the request dispatcher 354 instructs the transcoder 320 to deliver the transcoded content to multimedia server 302. At step 534, the transcoder 320 delivers the transcoded content to multimedia client 330 for display video or reproduce sound on the mobile device in response to the request. The feedback control processor 310, the throughput manager 336 and the adaptive encoder 320 measure and adapt the transmission of the multimedia content to current transmission conditions at step 536.

At step 538, it is determined whether the data delivery request is complete. If the data delivery is complete, processing terminates at step 540, otherwise processing resumes at step 536 where the data transmission is adapted in response to measured transmission performance.

It is understood that the mobile device platform and multimedia servers of the present invention can communicate with a wide variety of mobile device types.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A system for providing multimedia data to a mobile device, the system comprising:
   a mobile service platform comprising:
      an authentication processor for authenticating user requests from the mobile device over a request path; and
      a multimedia source controller for receiving the authenticated user requests for controlling at least one multimedia source;
   at least one multimedia server for receiving control commands via a control channel from the mobile service platform, the control commands being for controlling delivery of multimedia data to the mobile device over a wireless path separate from the request path; and at least one transcoder for receiving multimedia data from the at least one multimedia source and coupled to the at least one multimedia server.

2. The system of claim 1 wherein the at least one transcoder is integrated with a corresponding at least one multimedia server.

3. The system of claim 1 wherein the at least one transcoder is a stand-alone network device coupled between at least one multimedia source and at least one multimedia server.

4. The system of claim 1 wherein the mobile service platform further comprises a personalization information management processor for providing personalized data associated with a user of the mobile device.

5. The system of claim 1 wherein the at least one transcoder comprises an adaptive encoder for encoding multimedia data for delivery to the mobile device over a wireless path.

6. The system of claim 1 wherein the at least one multimedia server comprises a multimedia transmitter.

7. The system of claim 6 wherein the mobile device communicates with the multimedia transmitter using at least one of:
   a CDPD protocol;
   a TDMA protocol;
   a GSM protocol;
   an 802.11 protocol;
   a two way paging protocol;
   a CDMA protocol;
   a GPRS protocol;
   a CDMA-2000 protocol; and
   a W-CDMA protocol.

8. The system of claim 1 wherein the authentication processor accesses a plurality of user profile data structures.

9. The system of claim 1 wherein the mobile service platform further comprises a personalization information management processor for providing personalized data associated with a user of the mobile device, and wherein the personal information management processor accesses a plurality of user profile data structures.

10. The system of claim 1 wherein the at least one multimedia server accesses a device profile.

11. The system of claim 1 wherein the at least one multimedia server accesses a transmission profile.

12. The system of claim 1 wherein the multimedia server further comprises a feedback control processor coupled to the adaptive encoder, the feedback control processor being for controlling an encoded bit rate of the multimedia data in response to performance measurement feedback.

13. The system of claim 12 wherein feedback control processor is further for controlling at least one of a video encoding quantization step size, a video frame rate and video frame size of the multimedia data.

14. The system of claim 12 wherein feedback control processor is further for controlling an encoded bit rate, frame rate and frame size of the multimedia data in response to a transmission profile, a device profile and a measured transmission parameter.

15. The system of claim 1 wherein the mobile device comprises a client decoder communicating with the at least one multimedia server for decoding multimedia data received by the mobile device.

16. A multimedia delivery system comprising;
   a mobile service platform having a control path output;
   a multimedia server for serving multimedia content to a client on a path separate from the mobile service platform, the server having a session manager, an encoder, a feedback control and a control path input coupled to the control path output for directing the multimedia server to serve the multimedia content; and
   a client decoder having a performance measurement processor.

17. The system of claim 16 wherein the multimedia server further comprises a decoder coupled to a plurality of multimedia sources.

18. The system of claim 16 wherein the multimedia server further comprises a network state information data structure coupled to the feedback control and decision processor.

19. A wireless network, comprising:
   a mobile service platform having an authentication processor for authenticating user requests from the mobile device and a multimedia source controller for receiving the authenticated user requests for controlling at least one multimedia source;
   a multimedia server for receiving control commands from the mobile service platform and coupled to an adaptive transcoder for wireless data delivery; and
   a client decoder coupled to the mobile service platform via a user request path and coupled to the multimedia server via a wireless data delivery path separate from the user request path.

* * * * *